UNITED STATES PATENT OFFICE 1,955,887

PROCESS OF PREPARING M-ACYLAMINO-SULPHOCHLORIDES OF THE BENZENE SERIES

Wilhelm Neelmeier, Leverkusen-I. G. Werk, and Wilhelm Lamberz, Leverkusen-Wiesdorf, Germany, assignors to General Aniline Works, Inc., New York, N. Y., a corporation of Delaware No Drawing. Application August 10, 1932, Serial No. 628,271. In Germany September 9, 1931

10 Claims. (Cl. 260—124)

The present invention relates to a process of preparing m-acylaminosulphochlorides of the benzene series.

In accordance with our invention m-acylaminosulphochlorides are prepared by causing chlorosulphonic acid to act upon an acylamino compound of the benzene series of the general formula:

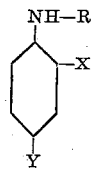

wherein R stands for an acyl radical of the aliphatic or aromatic series, for example, for acetyl, benzoyl, CO-O-alkyl, or for the group

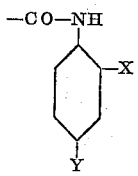

X stands for methyl, an alkoxy group or halogen and Y stands for hydrogen, methyl, alkoxy or halogen in such a manner that X does not represent halogen when Y stands for hydrogen or halogen.

The relative quantities of the two reacting components may be varied within the widest limits; as a general rule we wish to say that the process is favorably carried out with an excess of chlorosulphonic acid, our preferred method of working consisting in reacting with about 4 to about 6 parts by weight of chlorosulphonic acid upon about 1 part by weight of the acylamino compound of the benzene series. Likewise the temperature may be varied within the widest limits, for example, the process may be carried out at normal temperature up to temperatures of about 60° C. The time required for performing our new process somewhat depends upon the specific acylamino compound used and upon the temperature at which the process is carried out, lower temperatures requiring longer reaction times and vice versa. When working at normal temperature, the process generally is complete after about 24 hours, while, when working at the upper limit given, generally 2-3 hours are sufficient.

From the reaction mass the products are isolated in the usual manner by pouring on to ice as is more described in the following examples.

The m-acylaminosulphochlorides prepared according to our new process are valuable intermediate products for the manufacture of dyestuffs, synthetic drugs, insecticides, and auxiliary products for dyeing and textile purposes.

The invention is illustrated by the following examples, without being limited thereto:

*Example 1.*—165 parts by weight of 2-acetanisidine are introduced by and by into 660 parts by weight of chlorosulphonic acid at a temperature of 20–30° C., and the mass is stirred for about 20 hours at room temperature. The reaction mixture is then poured on to 3000 parts by weight of ice, the 2-acetanisidine-4-sulphochloride of the formula:

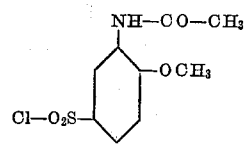

separates in a solid form, it is sucked off and washed with cold water until free from acid. From benzene or acetone it crystallizes in form of colorless needles of the melting point 149° C. Yield about 90% of theory.

When reacting in an analogous manner upon 1 part by weight of 2.2'-dimethoxy-diphenylurea with about 6 parts by weight of chlorosulphonic acid there is obtained the 2.2'-dimethoxy-diphenylurea-5.5'-disulphochloride of the formula:

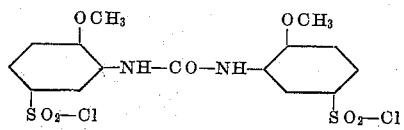

It crystallizes from acetone in colorless needles of the melting point 213° C.

When treating in an analogous manner 2-anisylurethane with 6 times its quantity of chlorosulphonic acid there is obtained the 2-anisylurethane-4-sulphochloride of the formula:

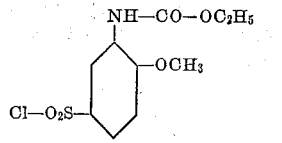

It crystallizes from acetone in colorless needles of the melting point 124° C.

*Example 2.*—149 parts by weight of N-aceto-o-toluidine are treated with 750 parts by weight of chlorosulphonic acid as described in Example 1. The reaction mixture is poured onto ice, the sulphochloride separated is sucked off and washed with cold water until free from acid. The N-aceto-o-toluidine-4-sulphochloride of the formula:

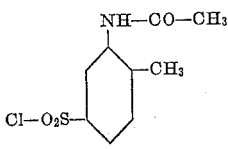

crystallizes from acetone in colorless needles of the melting point 144° C. The yield is 86% of theory.

*Example 3.*—211 parts by weight of N-benzoyl-o-toluidine are introduced into 6 times its quantity of chlorosulphonic acid. The mass is stirred at room temperature for about 20 hours, then heated at 40° C. for about 3 hours, while stirring; the mass is poured onto ice and the N-benzoyl-o-toluidine-4-sulphochloride of the formula:

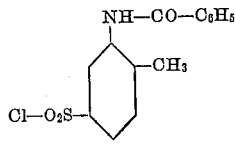

is isolated in the usual manner; it crystallizes from benzene in colorless needles of the melting point 196° C. The yield is about 90% of theory.

*Example 4.*—163 parts by weight of 1-acetamino-2.4-dimethylbenzene are treated with 978 parts by weight of chlorosulphonic acid and worked up as described in Example 1. The 1-acetamino-2.4-dimethylbenzene-5-sulphochloride thus obtained of the following formula:

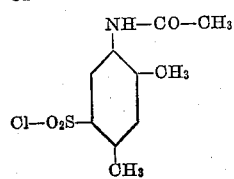

is redissolved from benzene in rhombic crystals of the melting point 147° C.

In an analogous manner there is obtained from:

| | |
|---|---|
| 1-acetamino-2-ethoxybenzene | The 1-acetamino-2-ethoxybenzene-5-sulphochloride; colorless needles from acetone; melting point 129° C. |
| 1-acetamino-2.4-dimethoxybenzene. | The 1-acetamino-2.4-dimethoxybenzene-5-sulphochloride; colorless needles from acetone; melting point 175° C. |
| 1-acetamino-2-methyl-4-methoxybenzene. | The 1-acetamino-2-methyl-4-methoxybenzene-5-sulphochloride; colorless needles from acetone; melting point 155° C. |
| 1-acetamino-2-methyl-4-chlorobenzene. | The 1-acetamino-2-methyl-4-chlorobenzene-5-sulphochloride; colorless needles from acetone; melting point 137° C. |
| 1-acetamino-2-methoxy-4-chlorobenzene. | The 1-acetamino-2-methoxy-4-chlorobenzene-5-sulphochloride; colorless needles from acetone; melting point 160° C. |

We claim:

1. The process which comprises reacting upon an acylamino compound of the benzene series of the general formula:

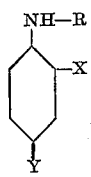

wherein R stands for an acyl radical of the aliphatic or aromatic series, X stands for a substituent selected from the group consisting of methyl, alkoxy and halogen, and Y stands for a substituent selected from the group consisting of hydrogen, methyl, alkoxy and halogen in such a manner that X does not represent halogen in case Y stands for hydrogen or halogen, with chlorosulphonic acid.

2. A process as claimed in claim 1, in which the process is carried out at room temperature up to temperatures of about 60° C.

3. The process which comprises reacting upon about 1 part by weight of an acylamino compound of the benzene series of the general formula:

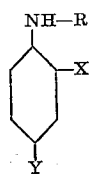

wherein R stands for an acyl radical of the aliphatic or aromatic series, X stands for a substituent selected from the group consisting of methyl, alkoxy and halogen, and Y stands for a substituent selected from the group consisting of hydrogen, methyl, alkoxy and halogen in such a manner that X does not represent halogen in case Y stands for hydrogen or halogen, with about 4 to about 6 parts by weight of chlorosulphonic acid.

4. A process as claimed in claim 3, in which the process is carried out at room temperature up to temperatures of about 60° C.

5. The process which comprises reacting upon an acylamino compound of the benzene series of the general formula:

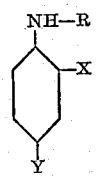

wherein R stands for an acetyl or benzoyl group, X stands for a substituent selected from the group consisting of methyl, alkoxy and halogen, and Y stands for a substituent selected from the group consisting of hydrogen, methyl, alkoxy and halogen in such a manner that X does not represent halogen in case Y stands for hydrogen or halogen, with chlorosulphonic acid.

6. A process as claimed in claim 5, in which the process is carried out at room temperature up to temperatures of about 60° C.

7. The process which comprises reacting upon an acylamino compound of the benzene series of the general formula:

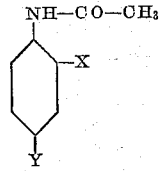

wherein X stands for a substituent selected from the group consisting of methyl, methoxy and ethoxy, and Y stands for a substituent selected from the group consisting of hydrogen, methyl, methoxy and ethoxy, with cholorsulphonic acid.

8. The process which comprises reacting upon about 1 part by weight of an acylamino compound of the benzene series of the general formula:

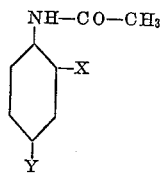

wherein X stands for a substituent selected from the group consisting of methyl, methoxy and ethoxy, and Y stands for a substituent selected from the group consisting of hydrogen, methyl, methoxy and ethoxy, with chlorosulphonic acid at room temperature up to temperatures of about 60° C.

9. The process which comprises reacting upon 165 parts by weight of 2-acetanisidine with 660 parts by weight of chlorosulphonic acid at room temperature for about 20 hours.

10. The process which comprises reacting upon 149 parts by weight of N-aceto-o-toluidine with 750 parts by weight of chlorosulphonic acid at room temperature for about 20 hours.

WILHELM NEELMEIER.
WILHELM LAMBERZ.